July 13, 1965
J. D. WALKER
3,194,756
PROCESS FOR DIGESTING SLUDGE AND DIGESTER THEREFOR
Filed Sept. 15, 1960
2 Sheets-Sheet 1
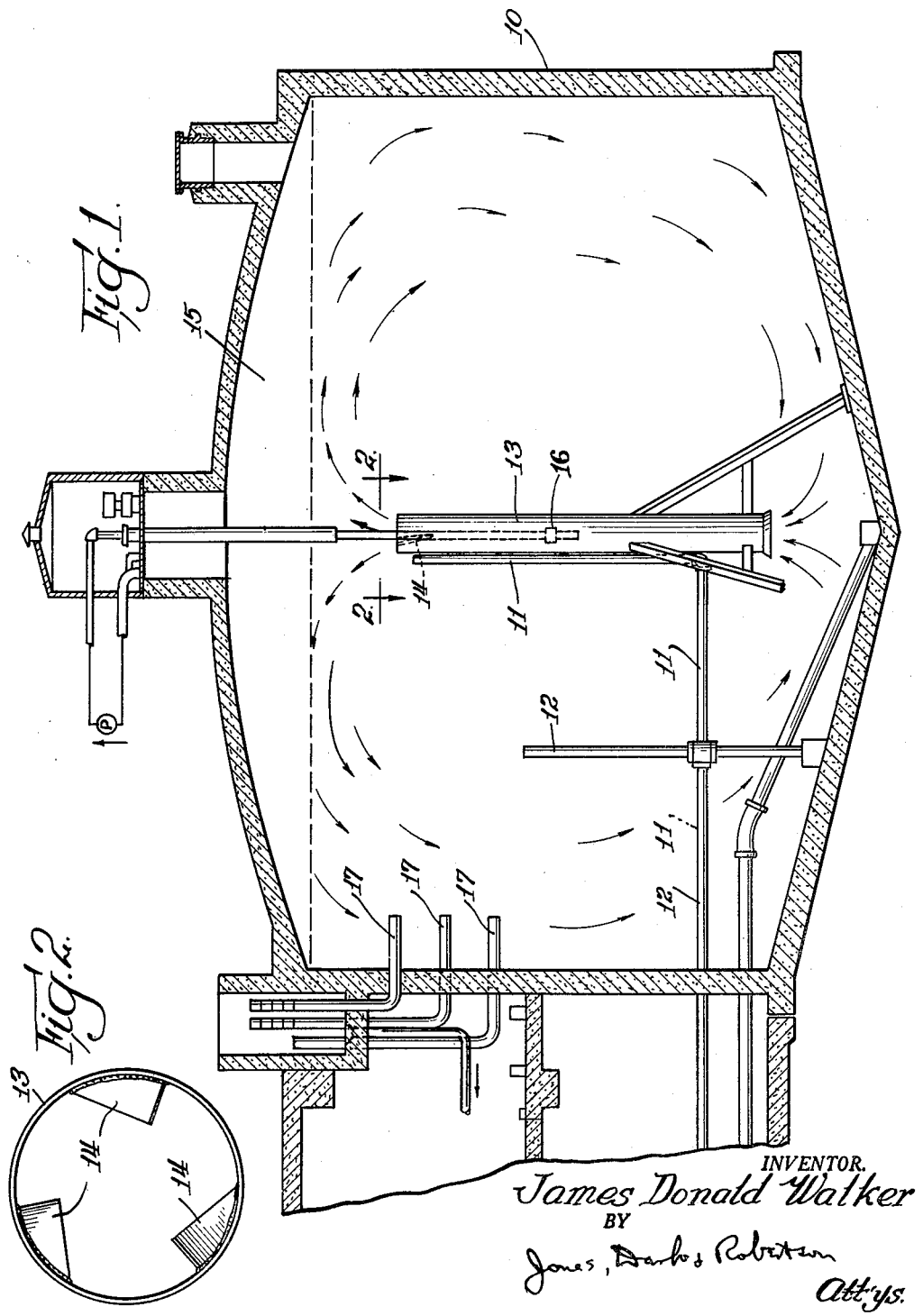
INVENTOR.
James Donald Walker
BY
Jones, Darby & Robertson
Att'ys.

July 13, 1965  J. D. WALKER  3,194,756
PROCESS FOR DIGESTING SLUDGE AND DIGESTER THEREFOR
Filed Sept. 15, 1960  2 Sheets-Sheet 2
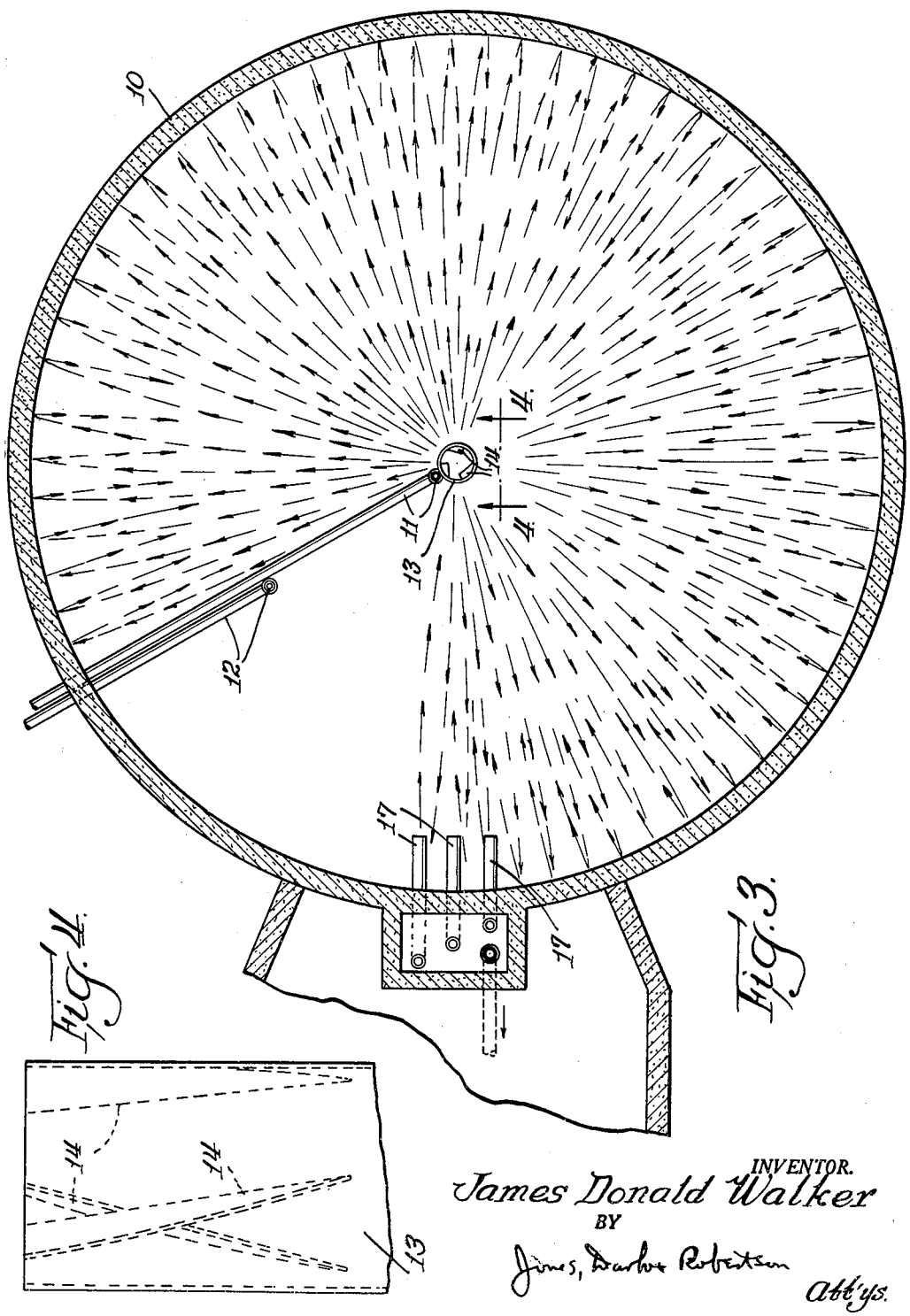
INVENTOR.
James Donald Walker 3,194,756
PROCESS FOR DIGESTING SLUDGE AND
DIGESTER THEREFOR
James Donald Walker, Aurora, Ill., assignor to Walker Process Equipment, Inc., Wilmington, Del., a corporation of Delaware
Filed Sept. 15, 1960, Ser. No. 56,132
9 Claims. (Cl. 210—14)

The present invention relates to improvements in the digestion of sludge derived from the treatment of waste or sewage.

In the past it has been common practice to mix the contents of the digester so that as the raw sludge is introduced into the digester it is mixed with sludge already undergoing digestion so that anaerobic bacteria in the previously digesting sludge will immediately seed or inoculate the raw sludge as it comes into the digester. However, this mixing has been done in such a way that the raw sludge was disseminated throughout the contents of the digester. That was thought desirable, but as a result thereof the said contents, upon being withdrawn, contained both raw sludge and sludge which had undergone various degrees of digestion. Although the quantity of raw sludge in the contents being withdrawn might have been small by percentage, even a small quantity of raw sludge is objectionable.

According to the present invention, this objectionable feature of the prior processes is overcome as the raw sludge is introduced into the digester at a predetermined point from which it is induced to follow a long circuitous path before it reaches the drawoff point and it thereby undergoes a high degree of digestion.

An object of the present invention is to provide a method for digestion in which the complete contents of the digester all undergo digestion of a high degree so that upon withdrawal of the contents no raw sludge will be included.

In the preferred form of the present invention, swirl vanes are located within a central updraft tube and the incoming raw sludge is discharged on one side of the tube from where it must follow a long circuitous path. It is quickly thoroughly mixed with the sludge already undergoing digestion and rich in anaerobic bacteria, and its long path ensures that when upon reaching the drawoff point of the digester it will have undergone a substantial degree of digestion.

The vanes also tend, especially if in the form shown, to constantly redistribute some of the sludge drawn into the tube from one radial plane among that drawn from several other radial planes, thereby preventing any undesirable concentration of raw sludge from remaining concentrated as it moves along the toroidal path.

These and other objects of the invention will be apparent to those skilled in the art when taken in conjunction with the following description and drawings in which:

FIGURE 1 is a vertical section taken through a gas-lifter digester showing the swirl vanes attached interiorly of the upper portion of the updraft tube for inducing the sludge therein into a toroidal path, as shown by the arrows.

FIGURE 2 is a plan view taken on lines 2—2 of FIG. 1 and shows three swirl vanes equally spaced around the inner circumference of the updraft tube.

FIGURE 3 is a horizontal sectional view of the gas-lifter digester of FIG. 1.

FIGURE 4 is a fragmentary view taken on line 4—4 of FIG. 3 and shows the swirl vanes affixed to the inner circumference of the updraft tube and being tilted 15° from the vertical.

Referring now to FIG. 1 of the drawings, the numeral 10 is a digester of one of various types in which the present invention would be incorporated. Numeral 11 indicates a tube or conduit through which green sludge from a sewage system is introduced or discharged into the digester.

Such digesters commonly have means for causing a vertical movement of the contents of the digester in the central area, imparting a rolling movement extending throughout the digester.

An alternate conduit or tube 12 through which raw sludge can be introduced is shown in the digester in FIG. 1. Modern digesters commonly have some means for forcing vertical movement of the contents in a central zone, thereby imparting a rolling movement to the entire contents. The most efficient way of doing this is by gas-lifting action in an updraft tube. Thus, centrally located in the digester 10 is an updraft tube 13. According to the present invention it has affixed therein swirl vanes 14. As gas is liberated from the digesting liquid, it collects above the liquid at the top of the enclosed digester, as at 15. This liberated gas is then drawn from the chamber 15 and pumped into a pipe which carries it to a sparger 16 (or into several pipes, each with a sparger) at a substantial depth inside the updraft tube 13. The gas thus liberated through the sparger produces a gas-lift action which causes gas within the updraft tube to rise, creating a lifting action upon the liquid sludge in the tube, which then flows out in all directions, producing a rolling movement. In any rolling movement digester vanes 14 prevent the contents in one area from just repeating a circuit over and over in the same area. Such vanes preferably are rather small so as not to act uniformly on all liquid passing upwardly in the digester, and hence mixing of sludge taken in from one radial plane with that taken from nearby radial planes is ensured. For example the vanes may be three small vanes equally spaced at 120° around the tube with each vane being tilted approximately 15° from the vertical.

Perferably the raw or green sludge is introduced to the digester through inlet tube 11. It is discharged at a point just outside or just inside of the updraft tube 13 so as to be mixed immediately with a strong current of sludge already undergoing digestion. In the past the discharge has been centered in updraft tube 13 and the rotation of the sludge undergoing digestion has quickly distributed the raw and denser sludge throughout the mass thereof.

When simultaneously withdrawing sludge from the digester, some of the raw sludge which had just been introduced into the digester would be withdrawn along with sludge which had undergone digestion. According to the preferred form of the present invention, the raw sludge is discharged on one side of the axis of the updraft tube, preferably just outside the top of the tube, and not on the same side as the drawoff means, so that it does not reach the drawoff point quickly. This is made tolerable because the vanes 14 prevent the raw sludge from circulating continuously in one zone of the digester 10. It is immediately mixed with the older sludge passing the raw sludge discharge and as the mixture comes up through the updraft tube 13, each time it will be nudged a little further in one direction around the circumference of the digester. Thus, in addition to the contents mainly circulating in vertical radial planes within the digester (radial-laminar flow) there is imparted a small additional movement in one rotary direction around the circumference of the digester. This constantly brings older sludge to the discharge point of raw sludge, the mixture including the raw sludge which has been introduced through the inlet tubes is nudged to a new radial plane. It thus becomes possible to so locate the raw sludge discharge, as shown, that the raw sludge will be carried in a toroidal path around the digester from the inlet tubes 11 or 12 through at least 300° around the digester to the drawoff tubes 17. Having thus negotiated the 300° or more around the circumference of the digester, the raw sludge will have been digested to a high degree, having been retained a considerable time since it was inoculated by the anaerobic bacteria in the already digesting sludge as it entered. It follows that upon withdrawing the sludge mixture from the digester no raw sludge will be included therein. The objectionable feature heretofore encountered in drawing off raw sludge during the withdrawal of a sludge mixture is entirely eliminated.

It should be understood that without the vanes 14, the flow in a gaslift updraft tube has been found to be quite laminar. By this is meant that that which is drawn in on one side flows straight up, and out on the same side. Even with the vanes 14, the flow may be mainly radial laminar, although with a slight twist at the upper end.

The vanes 14 as illustrated are of a nature to ensure adequate constant redistribution of the digester contents. Thus, with each vane 14 extending about 40° angularly about the axis of the updraft tube, some of the sludge rising in the updraft tube will be advanced about 40°. Mostly it will be advanced much less however. Hence sludge drawn into the tube from one radial plane will be redistributed among several others. Hence, if raw sludge should initially be too highly concentrated in one zone, it will not simply move along while remaining concentrated, but will be gradually redistributed and diluted with older sludge.

It may be found to be even better to have the angular extent of the vanes reduced, possibly to even as little as 1°, 5° being more likely. In that event, larger vanes may be desired. This will ensure longer minimum detention of the raw sludge.

The vanes are preferably at the top of the updraft tube so that the amount of circumferential movement can be kept small and fairly well predicted. With low vanes, the contents of the tube would rotate above the vanes, and raw sludge on its first pass, might come out in the radial plane of the drawoff.

What is claimed is:

1. In the treatment of sludge from a waste treatment plant, the improvement comprising: maintaining in a digester a body of digesting sludge; moving the central portion of the digester contents generally vertically then outwardly and returning, entirely with a mainly radial laminar flow which avoids extensive mixing of sludge from areas widely separated angularly about a vertical axis, but with a slight component of rotary movement about the vertical axis, to form a toroidal roll slowly advancing circumferentially; adding substantially all of the raw sludge at an off-center point swept by said flow to be mixed with the passing contents and to largely follow their advancing toroidal path; and withdrawing the mixture from the main body substantially entirely at a point in said path which is remotely spaced angularly about the central portion from the point of adding raw sludge.

2. The treatment of sludge from a waste treatment plant according to claim 1 wherein the raw sludge follows the toroidal path for at least 300° around the central zone of said digester before being withdrawn.

3. A treatment tank adapted to maintain therein a deep body of liquid to be treated, an undraft tube in the tank widely spaced from the walls thereof, terminating in upwardly and downwardly facing openings, one substantially directly above the other, and respectively below the liquid level and deep in the tank, means to liberate gas in the updraft tube to produce upflow of liquid through the tube and a toroidal roll including said upflow and return movement in the liquid surrounding the tube, deflector vanes within the tube to impart to the toroidal roll a small component of rotation circumferentially about the axis of the tube, inflow means having its discharge in the tank entirely on one side of the axis of the updraft tube so that incoming liquid to be treated will initially follow its toroidal course generally on said side of the axis being thereby mixed with relatively well treated liquid which has made the circumferential circuit, the mixture being slowly moved through the circuit by the vanes; and discharge means having its receiving opening in said tank positioned on another side of the axis at least 300° about the axis in the direction of said component from the position of said inflow discharge.

4. In a digester including a tank substantially closed except for gas drawoff means, an updraft tube and means for discharging gas at a substantial depth therein to produce upflow through the tube for inducing a rolling movement of the digester contents, the updraft tube having an inlet, an extended upflow portion, and an outlet vertically above the inlet and substantially within the upwardly projected area of the upflow portion, the improvement comprising: stationary swirl vanes operatively connected to the updraft tube to impart a component of circumferential rotation to the rolling movement.

5. In a digester including a tank substantially closed except for gas drawoff means, an updraft tube and means for discharging gas at a substantial depth therein to produce upflow through the tube for inducing a rolling movement of the digester contents, the updraft tube having an inlet, an extended upflow portion, and an outlet vertically above the inlet and substantially within the upwardly projected area of the upflow portion, the improvement comprising: swirl vanes affixed interiorly of the updraft tube to impart a slight circumferential rotation to liquid sludge rising in said tube.

6. In a digester including a tank substantially closed except for gas drawoff means, an updraft tube and means for discharging gas at a substantial depth therein to produce upflow through the tube for inducing a rolling movement of the digester contents, the updraft tube having an inlet, an extended upflow portion, and an outlet vertically above the inlet and substantially within the upwardly projected area of the upflow portion, the improvement comprising: swirl vanes affixed interiorly of the updraft tube to impart a slight circumferential rotation to liquid sludge rising in said tube; but, jointly considered, penetrating substantially less than the full cross section of the tube to produce a nonuniform rotation of the liquid within the updraft tube.

7. In a digester including an updarft tube and means for discharging gas at a substantial depth therein to produce upflow through the tube for inducing a rolling movement of the digester contents, the updraft tube having an inlet, an extended upflow portion, and an outlet vertically above the inlet and substantially within the upwardly projected area of the upflow portion, the improvement comprising: swirl vanes affixed interiorly of the updraft tube to impart a slight circumferential rotation to liquid sludge rising in said tube; and means for introducing raw sludge having its entire discharge structure, which discharges into the main space of the digester in a position exclusively on one side of the axis of the updraft tube and drawoff means having its entire intake structure positioned a substantial distance angularly about said axis therefrom.

8. In a treatment tank including an updraft tube and means for discharging gas at a substantial depth therein to produce upflow through the tube for inducing a rolling movement of the treatment tank contents, the updraft tube having an inlet, an extended upflow portion, and an outlet vertically above the inlet and substantially within the upwardly projected area of the upflow portion, the improvement comprising: stationary deflector means operatively connected to said updraft tube, to impart a component of circumferential rotation to the rolling movement; an inlet tube to introduce raw sludge to said treatment tank having its entire discharge positioned to discharge only at one side of the axis of the tube; and a drawoff tube having its entire intake structure at least 300° removed from said inlet tube discharge position around the circumference of said treatment tank in the direction of said component of rotation.

9. The process of digesting sludge which includes maintaining in a tank a substantial body of digesting sludge having sludge-digesting bacteria therein, introducing gas into a draft tube in and surrounded by said body to induce upflow in said tube and a consequent toroidal flow of radial-laminar nature centered through said draft tube, releasing raw sludge at a point swept by the toroidal flow but substantially on one side of the axis of the tube to be mixed mainly with the sludge on said side and to follow its toroidal path, imparting to the body a slow rotation in one direction about said axis, and withdrawing sludge from said body at a location at least 300° around said axis in said direction from said point, relatively free from sludge that has not followed a toroidal path cycling through the tube many times as it slowly moved in said direction.

References Cited by the Examiner
UNITED STATES PATENTS

| | | | |
|---|---|---|---|
| 2,077,907 | 4/37 | Streander | 210—220 X |
| 2,370,356 | 2/45 | Kamp et al. | 210—197 |
| 2,991,983 | 7/61 | Logan | 210—14 X |

FOREIGN PATENTS 582,801   8/33   Germany.

MORRIS O. WOLK, *Primary Examiner.*

CARL F. KRAFFT, EARL M. BERGERT, *Examiners.*